United States Patent Office 3,067,367
Patented Dec. 4, 1962

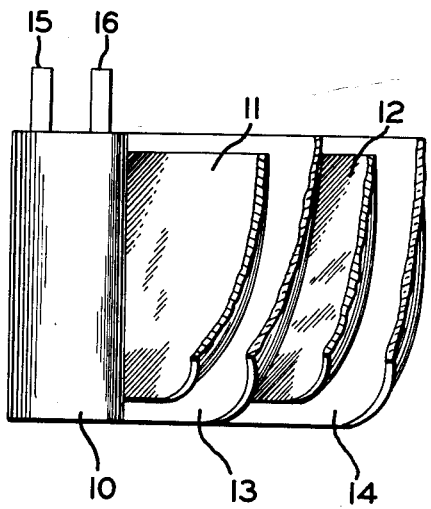

3,067,367
ELECTROLYTIC CAPACITOR
Sidney D. Ross, Williamstown, Mass., assignor to Sprague Electric Company, North Adams, Mass., a corporation of Massachusetts
Filed June 5, 1958, Ser. No. 744,888
2 Claims. (Cl. 317—230)

This invention relates to electrolytic capacitors, and more particularly to electrolytes for electrolytic capacitors, and still more particularly to self-supporting electrolytes for electrolytic capacitors.

Electrolytic capacitors traditionally have comprised an anode of a so-called "valve-metal" (e.g. aluminum, tantalum, niobium, titanium, zirconium, or alloys thereof). The surface of the anode is provided with an insulating film, as by being made anodic in an aqueous electrolytic bath containing borate ions. The true cathode of an electrolytic capacitor is an ionic conducting electrolyte in contact with the insulating film on the anode. For convenience sake, this true cathode will hereafter be referred to as the electrolyte. A cathode contact, hereafter referred to as the cathode, of a compatible valve-metal or of an inert metal is provided in contact with the electrolyte. Electrolytes for electrolytic capacitors must be not only good ionic conductors but must also be capable of reforming the insulating film on the anode should a rupture occur therein.

Present day electrolytic capacitors are usually wound assemblies having terminal leads connected to the anode and the cathode and extending from the assembly to permit connection into external circuits. While it is theoretically possible to convolutely wind an electrolytic capacitor with the cathode in contact with the insulating film on the anode, such a construction is not utilized because the pressure and friction of the cathode on the film would be likely to cause breaks in the film, thereby permitting shorting between the cathode and the anode. This shorting of the cathode to the anode would prevent the electrolyte from functioning to reform the insulating film and thus would render the capacitor permanently inoperative.

Actual production-type constructions prior to this invention have involved the use of a porous spacer between the cathode and the insulating film to not only protect the film but also to provide a path for entry of electrolyte into the capacitor. Although the spacers have been made of thin sheets of inert material, such as low density paper or cloth, they are undesirable nevertheless, because they introduce excessive resistance at low temperatures, and because they effectively reduce the unit volume conductivity of the space between the cathode and the insulating film. Spacers also have an inherent production disadvantage, in that they involve the introduction of an additional element in the capacitance section that is not required by theoretical considerations.

Conductivity in electrolytic capacitors prior to this invention is due to anionic and cationic excursion, that is, movement of ions to the anode and cathode of the capacitor. However, the only necessary ionic movement is that of the ions to the anode, in that these ions are needed to reform the insulating film that may become damaged during storage and operation of the capacitor.

It is an object of this invention to produce a practical electrolytic capacitor having only the classical elements of anode, insulating film, electrolyte, and cathode.

Another object of this invention is to produce electrolytic capacitors of either convolutely wound or stacked construction and which is made smaller than conventional capacitors by the elimination of all spacers between the cathode and the insulating film.

A further object of this invention is to produce an electrolytic capacitor that does not require a spacer or any other element foreign to a classical capacitor.

A still further object of this invention is to produce an electrolytic capacitor having an electrolyte film that permits the flow of anions to the anode, and impedes the flow of cations.

Further objects of this invention will become apparent during the course of the description and claims and by reference to the appended drawing of this application.

The objects of this invention ore attained by the production of an electrolytic capacitor having a flexible self-supporting electrolyte. More specifically the objects are attained in accordance with this invention by the production of an electrolytic capacitor utilizing an insoluble high molecular weight polymeric film as the electrolyte.

The self-supporting polymeric film electrolytes used in accordance with this invention have cations which are highly cross-linked and non-diffusable and whose charges are balanced by diffusable anions. Basically, the polymeric electrolytes of this invention are polymers with positive charges on the backbone of the polymer, and with anions free to move to the anode of the capacitor, so as to permit reformation of the conventional insulating film which is an oxide of the anode metal.

There are two general types of polymeric electrolytes suitable for this invention that are distinguished more by their method of preparation than by their function in a capacitor. One type of polymeric electrolyte is produced by first forming a polymer, such as polyethylene or polyvinyl chloride, and then introducing ionic groups periodically into the polymer structure. Another type of polymeric electrolyte is produced as a true homogeneous mass by building the ionic groups into the resin structure during resin polymerization. The primary requirements of polymers for use in this invention are that they must permit diffusion of ions, they must contain sufficient accessible ionic groups, they must be chemically stable, and they must be sufficiently cross-linked to have very little solubility. These polymeric electrolytes also must have sufficient porosity to permit a high rate of ionic diffusion.

The self-supporting polymeric electrolyte films of this invention are employed as capacitor electrolytes in combination with a plasticizer which functions to wet the polymer so as to lower the electrical resistance thereof. That is, the polymeric electrolytes comprise plasticized polymers containing salified or neutralized ionic groups. Suitable plasticizers for use in this invention include adipates, alkylene glycols, alkylene glycolates, glycerols, polyalkylene glycols, glycerol esters, phthalates, stearates, hydrogenated phthalates, phosphates, amides. High dielectric constant plasticizers are preferred and give optimum results from a conductivity standpoint. High boiling plasticizers are used for high temperature service; the plasticizers should not be capable of electrolytic action. More specifically, the plasticizers include di-(2-ethylhexyl) adipate, dinonyl adipate, dibutoxyethyl adipate, glycerol tributyrate, dimethoxytetraglycol, dibutoxytetraglycol, polyethylene glycol, di-(2 - ethylhexoate), polyethylene glycol 300, ethylene glycol monobutylether laurate, diethyl phthalate, dibutyl phthalate, dioctyl phthalate, dibutyl sebacate, tri-n-butyl phosphate, dibutyl tartrate, formamide, dimethylformamide. The amount of plasticizer include in the electrolyte composition may vary from as little as about 5% to about 70% or more by weight of the composition, depending on the particular properties desired, the resistivity at depressed and elevated temperatures, and susceptibility of the anode metal to the oxidation phenomena.

The polymeric electrolytes of this invention are preferably polymers containing ammonium groups as integral parts of the polymer lattice and an equivalent amount of anions such as borates, phosphates, citrates, etc. Examples of polymeric electrolytes within the scope of this invention include neutralized polyvinyl pyridine, substituted polyvinyl pyridines, amino substituted polystyrenes, polyallyl amines, aniline formaldehyde polymers. These polymers may be used either in the form of their acid-addition salts or quaternary ammonium salts. Thus, borates, sulfates, citrates, hydrochlorides, etc. (acid-addition salts) and butyl bromides, methosulfates, ethosulfates, etc. (quaternary ammonium salts) are utilizable in the invention.

Although the electrolyte polymers are to be considered as self-supporting, there are applications when it is preferred to combine the polymer film with a spacer of the type now presently used in the electrolytic capacitor art. Such applications include use in assemblies subjected to high levels of acceleration and deceleration, high temperature applications wherein it is desired to maintain a certain level of internal resistance to meet reactance requirements, and for those highly plasticized systems more susceptible to thermal flow.

While the description of this invention has been restricted thus far to use of polymeric electrolytes between conventional self-supporting electrodes, it should be understood that the invention is not restricted thereto. For example, the polymeric electrolytes may be metallized to provide one or both of the electrodes of a capacitance section, or self-supporting electrodes may be coated with the polymers of this invention.

In a like manner, while the description has been of a capacitor utilizing the polymeric electrolyte as a working electrolyte to provide conductivity and to reform any breaks that might occur in a previously formed oxide film, the invention is not so restricted. The polymeric electrolytes of this invention may be employed to establish the insulating oxide film on the anode either prior to the construction of a capacitor, or in a capacitance section.

Reference is made to the appended drawing, in which capacitance section 10 is shown in a partly unrolled condition. Anode 11 of capacitance section 10 is of a so-called "valve-metal" (e.g. tantalum) having on its surface an insulating oxide layer. Cathode 12 may also be made of tantalum or of an inert material such as silver. The polymeric electrolyte films 13 and 14 are of a salified ionic group polymer, salified polyethylene amine containing an inert organic plasticizer, e.g. ethylene glycol. Tabs 15 and 16 are connected to electrodes 11 and 12 respectively, to function as terminals for capacitance section 10.

Inasmuch as the application of the polymeric electrolyte in electrolytic capacitors forms the preferred feature of my invention, the following examples, to be construed merely as illustrative but not limitative of the invention, describe how the polyelectrolytes may be incorporated in capacitor structure. The electrodes of the capacitor are of any of the normally utilized metals, such as aluminum, tantalum, niobium, titanium, zirconium, or any of the other valve-metals.

Example 1

A 3 mil thick polyelectrolyte film of an amino substituted polystyrene quaternized with methyl borate containing 30% ethylene glycol as its plasticizer was wound with an etched and formed (400 v.) aluminum anode and an unformed cathode in a capacitance section in the conventional manner used to prepare an unimpregnated section with a porous spacer, except that subsequent impregnation is not required. Following winding, a heat treatment and/or preliminary aging may be carried out to obtain equilibrium in the structure. Also, the wound unit may be molded under heat and/or pressure to form a rigid assembly. An external insulating casing, such as a thermoset resin may be applied after this operation.

Other polyelectrolyte systems which are satisfactorily used in the capacitor of this example include:

60% polyvinyl pyridine borate with a plasticizer of 40% diethyl phthalate;

50% polyvinyl pyridine methosulfate with a plasticizer of 50% dibutyl phthalate.

Example 2

Following the procedure of Example 1, except that a self-supporting film of 1 mil thickness of polyallylamine salified with dibutyl phosphoric acid containing 15% tributyl phosphate plasticizer is substituted for the electrolyte film and a tantalum anode formed to 200 volts and an unformed cathode are substituted for the aluminum electrodes in the reference example.

Example 3

Formed tantalum anodes and unformed tantalum cathodes are coated with an adherent layer of 70% of the butyl bromide quaternary salt of polyvinyl pyridine in 30% dibutyl phthalate plasticizer, using general coating methods such as calendering or spraying. The coated electrodes are then stacked or wound in the usual manner to form an electrolytic capacitor.

Example 4

A 3 mil thick polymeric electrolyte film of cross-linked polystyrene, nitrated, reduced and quaternized with methyl chloride having 25% by weight of dimethylformamide as plasticizer was inserted between two plain unformed tantalum electrodes to prove the effectiveness of the polyelectrolytes of this invention as formation electrolytes. A constant current of 10 milliamperes was imposed on the capacitance section and the voltage buildup was recorded against time. It was found that the tantalum anode was "formed" to 245 volts in 4 minutes, and that sparking did not occur until 250 volts had been reached. The leakage current at 240 v. after 35 minutes was found to be 250 microamperes.

As many apparently widely different embodiments of this invention may be made without departing from the spirit and scope thereof, it is to be understood that the invention is not limited to the specific embodiments thereof except as defined in the appended claims.

This application is in part a continuation of my co-pending application S.N. 438,601 filed June 22, 1954, and later abandoned.

What is claimed is:

1. An electrical capacitor having an anode electrode and a cathode electrode, a dielectric film on said anode, a film spacer between said electrodes consisting essentially of a cross-linked polymeric electrolyte, having non-acidic positive charges on the backbone of the polymeric chain of said polymeric electrolyte, positively charged resin backbone being highly cross-linked so as to be non-diffusible, negative ions of said electrolyte balancing said positive charges and being diffusible, the polymer lattice of said cross-linked polymeric electrolyte including a porosity whereby said negative ions are free to move to the anode of the capacitor and said dielectric film is reformable by said negative ions with an absence of ionic movement to the cathode in said capacitor, said polymeric electrolyte having from about 5 to 70 percent plasticizer and said electrolyte being substantially insoluble in said plasticizer.

2. An electrical capacitor having an anode electrode of film forming metal and a cathode electrode, a dielectric film formed on said anode, a film spacer between said electrodes consisting essentially of a cross-linked high molecular weight polymeric electrolyte having non-acidic positive charges on the backbone of the polymeric chain of said polymeric electrolyte selected from the group consisting of quaternized polyvinyl pyridine, substituted polyvinyl pyridine, amino substituted polystyrene, polyallyl amine and aniline formaldehyde polymers, said positively charged resin backbone being highly cross-linked so as to be non-diffusible, negative ions of said electrolyte balancing said positive charges and being diffusible, the polymer lattice of said cross-linked polymeric electrolyte including a porosity whereby said negative ions are free to move to the anode of the capacitor by ionic diffusion through said porous electrolyte and said dielectric film is reformable by said negative ions with an absence of ionic movement to the cathode in said capacitor, said polymeric electrolyte having from about 5 to 70% plasticizer and said electrolyte being substantially insoluble in said plasticizer.

References Cited in the file of this patent

UNITED STATES PATENTS

| | | |
|---|---|---|
| 1,918,717 | Ruben | July 18, 1933 |
| 2,145,710 | Clark | Jan. 31, 1939 |
| 2,149,086 | Craine | Feb. 28, 1939 |
| 2,166,179 | Ruben | July 18, 1939 |
| 2,310,932 | Brennan | Feb. 16, 1943 |
| 2,786,088 | Robinson | Mar. 19, 1957 |

FOREIGN PATENTS

| | | |
|---|---|---|
| 468,270 | Great Britain | July 1, 1937 |